March 30, 1954     O. L. NORDIN     2,673,660
PRESSURE RELIEF DEVICE
Filed July 10, 1950
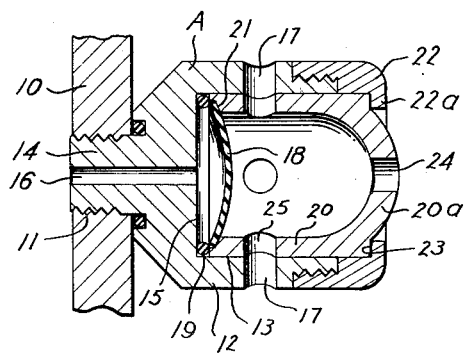
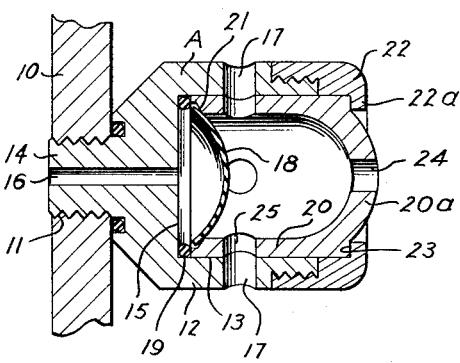
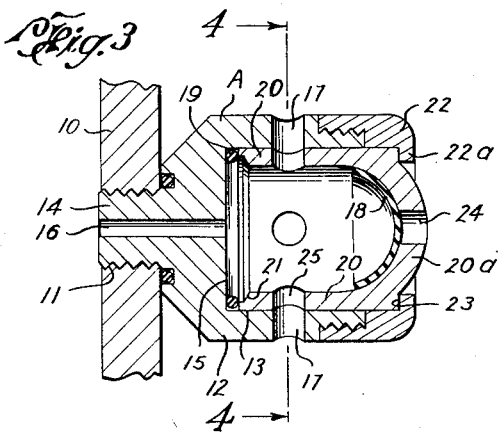
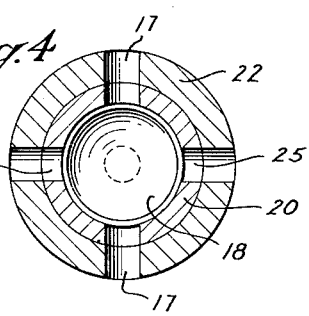
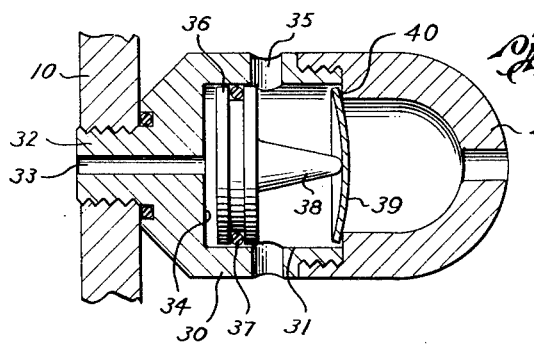
Obert L. Nordin
INVENTOR.
BY J. Vincent Martin
and
Jod E. Edwards
ATTORNEYS Patented Mar. 30, 1954

2,673,660

UNITED STATES PATENT OFFICE 2,673,660

PRESSURE RELIEF DEVICE

Obert L. Nordin, Houston, Tex., assignor to Thornhill-Craver Company, Inc., Houston, Tex., a corporation of Texas Application July 10, 1950, Serial No. 172,937

5 Claims. (Cl. 220—85)

The invention relates to new and useful improvements in pressure relief devices.

Various types of pressure relief devices and valves have been employed in pressure lines and systems for relieving pressure in the line or system when said pressure exceeds a predetermined point and many of these devices employ a frangible closure element which is adapted to be broken or ruptured under excessive pressure conditions. In this type of device, the closure element, which is usually in the form of a disc, is ruptured or fractured by shear; the shear strength of the element is a function of the heat treatment of the material as well as the chemical analysis of such material with the result that shear strength is dependent upon physical characteristics which cannot be accurately controlled. Therefore, sensitivity of operation and accurate control of the exact pressure at which the element is ruptured is difficult.

It is one object of this invention to provide an improved pressure relief device which is extremely sensitive in operation whereby the device may be arranged to be actuated upon the attainment of a predetermined exact pressure in a pressure line or system.

An important object of the invention is to provide an improved pressure relief device which does not depend upon the shear strength of a frangible element but which employs a closure element which is wholly displaceable from closing position by the pressure within the system, whereby the displacement of the element is not dependent upon the physical characteristics of the element.

A particular object is to provide a relief device having a control element which is normally mounted in closing position and is exposed to the pressure in the line or system; said element being so arranged that the control of the pressure in the line or system at which the element will be displaced to open said line, is dependent on the modulus of elasticity of the material of which the element is constructed, rather than being dependent upon other physical properties of the material, such as tensile strength, shear strength, compression, and bearing strength, whereby extremely accurate and sensitive setting of the device may be accomplished.

Still another object is to provide a control element for a relief device which may be constructed of any suitable material having its modulus of elasticity independent of or substantially unaffected by physicals, chemicals or heat treatment.

A further object is to provide a device of the character described wherein the control element is in the form of a disc which also functions as a closure to hold the pressure within the pressure line or system; displacement of the disc by the attainment of a predetermined pressure within the line or system opening said line or system to effect a relief of pressure.

Still another object is to provide a control element which is normally held in a predetermined position by its inherent shape and which co-acts with a movable valve means to maintain the valve in a position closing a relief opening in a pressure line or system; displacement of the control element by excessive pressure within the line or system permitting opening of the valve means to relieve the excessive pressure in said line or system.

A particular object is to provide a control element controlled in its operation by the modulus of elasticity of the material of which the element is constructed and which when operated to relieve excessive pressures in a line or system is not destroyed but may be re-used.

The construction designed to carry out the invention will be hereinafter described together with other features thereof.

The invention will be more readily understood from a reading of the following specification and by reference to the accompanying drawings forming a part thereof, wherein an example of the invention is shown, and wherein:

Figure 1 is a longitudinal sectional view of a relief device constructed in accordance with the invention and illustrating the control element functioning as a closure and disposed in a closed position, Figure 2 is a similar view with the element partially displaced, Figure 3 is a similar view with the element fully displaced, Figure 4 is a transverse sectional view, taken on the line 4—4 of Figure 3, and Figure 5 is a longitudinal sectional view of a modified form of the invention and showing a control element coacting with a valve means to control opening thereof by an excessive pressure.

In the drawings, the numeral 10 designates the wall of a pressure system or conductor within which a pressure fluid is contained. The wall has an opening 11 which is preferably threaded to receive the improved relief device A constructed in accordance with the present invention. The pressure system or conductor to which the device is applicable may contain any type of pressure fluid and as will be hereinafter described, the device A is adapted to be actuated upon the attainment of a predetermined pressure within the system or conductor. It is noted that the relief of the pressure from the system may be for the purpose of lowering the pressure in the system or for operating a valve or for any other desired purpose.

The device A comprises a tubular body 12 having a cylindrical bore 13 which extends inwardly from one end of the body. The opposite end of the body is formed with a reduced connecting nipple 14 which is preferably made integral with the body. An annular shoulder 15 is formed within the body and an axial passage 16 extends through the nipple to establish communication between the pressure system beyond the wall 10 and the bore 13 of the body beyond the shoulder 15. The wall of the body 12 is formed with a plurality of vent openings or ports 17 which are located in the body at a point spaced beyond the shoulder 15.

For normally closing the passage 16 which communicates with the pressure in the system so as to prevent the escape of pressure through the vent opening 17 a closure and control element 18 which is illustrated in the form of a metallic disc is provided. The disc is dished or concavo-convex, as is clearly shown in Figure 1, and has a normal external diameter slightly less than the diameter of the bore 13 of the body. The peripheral edge portion of the disc is arranged to engage a packing ring 19 which is disposed within the bore 13 adjacent the shoulder 15 and the disc, as well as the packing ring, is retained in position in the body by means of an annular retaining member or sleeve 20. The inner end of the member 20 is formed with an annular shoulder 21 which engages and confines the peripheral edge portion of the metallic disc 18 and the shoulder 21 is slightly curved to conform to the normal curvature of the disc. The retaining member 20 is maintained in position within the bore of the body by a flanged collar 22 which is threaded onto the outer end of the body 12 and which has a flange 22a abutting an annular external shoulder 23 provided on the member 20. The outer end of the member is closed as indicated at 20a except for a relief port or opening 24 formed in said closed end. When the retaining member 20 is in position holding the metallic disc in position overlying a passage 16, radial ports or openings 25 in the retaining member are in registration with the vent opening 17 provided in the body. It will be evident that when the disc 18 is in assembled position within the body, as illustrated in Figure 1, the disc spans the bore of the body and the bore of the tubular retaining member 20 and shuts off a communication between the passage 16 which communicates with the pressure system and the vent openings 17 in the body.

The metallic disc 18 has a predetermined modulus of elasticity and is constructed of a material whose modulus is substantially constant regardless of the other physicals of the element which may vary due to chemical analysis or heat treatment. The inner concave surface of the disc 18 is constantly exposed to the pressure within the system through the passage 16, and this pressure is tending to deform or distort the disc element in a direction which will increase its curvature and the amount of this deformation or deflection is dependent upon the modulus of elasticity of the material.

It will be evident that when the pressure in the passage 16 acting against the disc reaches a point sufficient to deform said disc in the manner illustrated in Figure 2, such deformation will result in a reduction of the external diameter of the disc. Deformation of the disc by excessive pressure, which deformation is controlled by the modulus of elasticity of the material, will continue until the peripheral external diameter of the disc has been reduced sufficiently to permit the peripheral edge of the disc to clear the shoulder 21 and when this occurs the pressure will move the disc against the closed end 20a of the retaining element as shown in Figure 3. It is preferable that the inner surface of the closed end 20a be curved or concave so that the disc will fit against said end. The opening 24 in the closed end 20a of the retaining member permits rapid movement of the disc into contact with the closed end since it allows the escape of air in advance of said disc. When the disc or element 18 has been moved to the position shown in Figure 3, said disc no longer spans the bore 13 of the body between the passage 16 and the vent opening 17 and thus, there is a free communication between the passage 16 and the vent opening 17. Pressure within the system or conductor beyond the wall 10 may thus flow through the passage 16 into the bore of the retaining member 20 and then through the openings 25 and outwardly through the vent openings 17 whereby the pressure is released. The relief of pressure within the system or conductor may be utilized to actuate a valve or for any other purpose or merely to relieve the pressure in a pressure system.

It is well known that in materials of a given class, such as steel, brass, etc., the modulus of elasticity remains constant and is independent of other physicals, chemicals and heat treatment. In the present device the pressure at which the disc 18 is displaced is controlled solely by the modulus of elasticity of the material of which the disc is constructed. As is well known, the modulus of elasticity is the ratio of stress to strain in a given material, within the elastic limit of the material, and it is therefore possible to accurately construct the disc to be displaced at the exact point at which the pressure is to be relieved. The device thus provides a very sensitive arrangement so that pressure in a system or conductor may be relieved at any predetermined selected point.

In Figures 1 to 4 the disc 18 functions as a closure element for closing the passage 16 and also functions as the control element which is responsive to pressures to open the passage upon the attainment of a predetermined pressure in the system. The same principle whereby the modulus of elasticity of a material may control the point at which the passage 16 is opened is also illustrated in the modified form shown in Figure 5.

In this figure a tubular body 30 having a bore 31 and a reduced connecting nipple 32 is connected in the wall of the pressure system or conductor. A passage 33 extends through the connecting nipple and communicates with the inner end of the bore 31 adjacent an annular shoulder or surface 34 within the body. Vent openings 35 extend radially through the body and are spaced from the annular surface 34. A piston type valve member 36 is mounted within the bore 31 and has a suitable packing ring 37 thereon and normally this valve is adapted to be disposed within the inner end of the bore 31 between the passage 33 and the vent opening 35. The valve is provided to shut off communication between said passage and said opening. The valve is formed with an axial extension 38 which engages a metallic strap or beam element 39. The beam element has its ends abutting a shoulder 40 of a retaining cap 41 which is threaded onto the body 30.

The operation of this form is substantially identical to the operation of the form hereinbefore described except that the control element or beam 39 and the valve 36 are substituted for the closure disc 18 of the first form. The beam or control element 39 is normally retained in position with its ends latched or held beneath the annular shoulder 40, said element being retained in this position by the pressure acting through the passage 33 and against the valve 36. The modulus of elasticity of the material of which the control element 39 is constructed is predetermined, and thus, when the pressure exceeds a predetermined amount, the beam or element 39 is deformed so as to reduce its length and thereby permit disengagement of the element from the shoulder 40. When this occurs, the pressure may move the valve 36 in a direction to the right in Figure 5 and beyond the vent openings 35. This establishes communication between the passage 33 and the vents 35 to permit escape of pressure from the system. As in the first form, the modulus of elasticity of the material of the control element is the factor which determines the point at which the pressure is released.

Having described the invention, I claim:

1. The combination with a pressure line having a relief opening of a tubular body having a cylindrical bore extending inwardly from one end of said body, the opposite end of said body being formed with a reduced connecting nipple integral with said body, an axial passage including said relief opening extending through said nipple to establish communication between said pressure line and the bore of said body, the wall of said body being formed with a plurality of vents located at points spaced beyond said nipple portion, a concavo-convex closure and control element having a normal external diameter slightly less than the diameter of said bore and disposed within said bore with the concave surface facing said axial passage, the end of said tubular body opposite said nipple end being substantially closed by a cap member secured thereto, said cap member being provided with an annular shoulder abutting the marginal edge portion of the convex surface of said concavo-convex closure and control element, said closure and control element having a predetermined modulus of elasticity, and means for applying the pressure within said axial passage to said closure and control element, whereby, when the pressure exceeds a predetermined point in said pressure line, the relieved pressure acting upon the concave surface of said closure and control element reduces the normal external diameter thereof in accordance with its modulus of elasticity to release said closure and control element without rupturing the same and forcing said closure and control element towards said end of said tubular body that is substantially closed.

2. The combination with a pressure line having a relief opening of a tubular body having a cylindrical bore extending inwardly from one end of said body, the opposite end of said body being formed with a reduced connecting nipple integral with said body, an axial passage including said relief opening extending through said nipple to establish communication between said pressure line and the bore of said body, an annular shoulder within said body concentric with said axial passage and adjacent thereto, the wall of said body being formed with a plurality of vents located at points spaced beyond said shoulder, a concavo-convex closure and control element having a normal external diameter slightly less than the diameter of said bore and disposed within said bore adjacent said shoulder with the concave surface adjacent said axial passage and retained in position by a sleeve member mounted within said bore and also formed with an annular shoulder abutting the convex surface of said closure and control element and substantially closed at the end opposite said shoulder said sleeve member being maintained in position within the bore by means cooperating with said tubular body, said concavo-convex closure and control element having a predetermined modulus of elasticity, whereby when the pressure exceeds a predetermined point in said pressure line, the relieved pressure acting upon the concave surface of said closure and control element reduces the normal external diameter thereof in accordance with its modulus of elasticity to release said closure and control element without rupturing the same and forcing said closure and control element towards said end of said sleeve that is substantially closed.

3. The combination as set forth in claim 2 wherein the concavo-convex closure and control element is a disc which functions as a closure for said relief opening.

4. The combination with a pressure line having a relief opening of a tubular body having a cylindrical bore extending inwardly from one end of said body, the opposite end of said body being formed with a reduced connecting nipple integral with said body, an axial passage including said relief opening extending through said nipple to establish communication between said pressure line and the bore of said body, an annular shoulder within said body concentric with said axial passage and adjacent thereto, the wall of said body being formed with a plurality of vents located at points spaced beyond said shoulder, a concavo-convex closure and control element having a normal external diameter slightly less than the diameter of said bore and disposed within said bore adjacent said shoulder with the concave surface adjacent said axial passage, and retained in position by an annular retaining member secured to said body and having an annular flange which contacts the peripheral edge of said closure and control element on its convex surface to hold said element between said annular flange and said annular shoulder in passage-closing position, said concavo-convex closure and control element having a predetermined modulus of elasticity, said retaining member having a closed curved end with a relief port therein, whereby, when the pressure exceeds a predetermined point in said pressure line, the relieved pressure acting upon the concave surface of said closure and control element reduces the normal external diameter thereof in accordance with its modulus of elasticity to release said closure and control element without rupturing the same and forcing said closure and control element towards said end of said retaining member.

5. The combination with a pressure line having a relief opening of a tubular body having a cylindrical bore extending inwardly from one end of said body, the opposite end of said body being formed with a reduced connecting nipple integral with said body, an axial passage including said relief opening extending through said nipple to establish communication between said pressure line and the bore of said body, the wall of said body being formed with a plurality of vents located at points spaced beyond said nipple portion, a concavo-convex closure and control element having a normal external diameter slightly less than the diameter of said bore and disposed within said bore with the concave surface facing said axial passage, the end of said tubular body opposite said nipple end being substantially closed by a cap member secured thereto, said cap member being provided with an annular shoulder abutting the marginal edge portion of the convex surface of said concavo-convex closure and control element, said closure and control element having a predetermined modulus of elasticity, and means for applying the pressure within said axial passage to said closure and control element, said means including a piston-type valve slidably disposed within said cylindrical bore of said tubular body between said opposite end of said tubular body and said concavo-convex closure and control element, and means on one side of said piston-type valve engaging said closure and control element, the other side of said piston-type valve facing said axial passage whereby, when the pressure in said pressure line exceeds a predetermined point, said valve moves on said tubular body away from said axial passage and acts against said closure and control element to reduce the normal external diameter thereof to thereby release same without rupturing and to force said closure and control element toward said end of said tubular body that is substantially closed.

OBERT L. NORDIN.

References Cited in the file of this patent

UNITED STATES PATENTS

| Number | Name | Date |
|---|---|---|
| 213,292 | Lunkenheimer | Mar. 18, 1879 |
| 328,008 | Conner et al. | Oct. 13, 1885 |
| 1,068,193 | Weil | July 22, 1913 |
| 1,774,946 | Rankin | Sept. 2, 1930 |
| 1,951,926 | Davidson | Mar. 20, 1934 |
| 2,098,885 | Safford | Nov. 9, 1937 |
| 2,426,808 | Auer | Sept. 2, 1947 |
| 2,429,149 | Wittenberg | Oct. 14, 1947 |

FOREIGN PATENTS

| Number | Country | Date |
|---|---|---|
| 216,036 | Great Britain | May 22, 1924 |